US00RE42800E

(19) United States
(12) Reissued Patent
Kenney et al.

(10) Patent Number: US RE42,800 E
(45) Date of Reissued Patent: Oct. 4, 2011

(54) APPARATUS, AND ASSOCIATED METHOD, FOR FACILITATING SELECTION OF POWER LEVELS AT WHICH TO COMMUNICATE DATA IN A RADIO COMMUNICATION SYSTEM

(75) Inventors: Thomas J Kenney, Portland, OR (US); Jean-Marie Tran, San Diego, CA (US)

(73) Assignee: Nokia Corporation (FI)

(21) Appl. No.: 11/599,639

(22) Filed: Nov. 15, 2006

Related U.S. Patent Documents

Reissue of:
(64) Patent No.: 6,819,935
Issued: Nov. 16, 2004
Appl. No.: 09/943,856
Filed: Aug. 31, 2001

(51) Int. Cl.
*H04B 7/00* (2006.01)
*H04B 1/04* (2006.01)
*H04B 17/00* (2006.01)
*H04Q 11/12* (2006.01)

(52) U.S. Cl. .... 455/422; 455/69; 455/127.1; 455/67.11; 455/127.2

(58) Field of Classification Search ..... 455/522, 455/69, 127.1, 67.11, 226.1, 63.1, 68, 127.2
See application file for complete search history.

(56) References Cited

U.S. PATENT DOCUMENTS 5,216,692 A * 6/1993 Ling ..... 375/130
5,604,730 A * 2/1997 Tiedemann, Jr. ..... 370/252
5,914,950 A * 6/1999 Tiedemann et al. ..... 370/348
5,946,346 A * 8/1999 Ahmed et al. ..... 375/219
6,058,107 A * 5/2000 Love et al. ..... 370/332
6,253,063 B1 * 6/2001 Cudak et al. ..... 455/63.1
6,334,047 B1 * 12/2001 Andersson et al. ..... 455/69
6,366,778 B1 * 4/2002 Bender et al. ..... 455/442
6,493,328 B2 * 12/2002 Fong et al. ..... 370/329
6,609,008 B1 * 8/2003 Whang et al. ..... 455/522
6,621,804 B1 * 9/2003 Holtzman et al. ..... 370/329
6,687,510 B2 * 2/2004 Esteves et al. ..... 455/522
6,895,057 B1 * 5/2005 Balachandran et al. ..... 375/259
6,898,192 B2 * 5/2005 Chheda et al. ..... 370/311
6,996,415 B2 * 2/2006 Lee et al. ..... 455/522
7,031,742 B2 * 4/2006 Chen et al. ..... 455/522
7,058,400 B2 * 6/2006 Brooks ..... 455/424
7,069,037 B2 * 6/2006 Lott et al. ..... 455/522
7,079,827 B2 * 7/2006 Richards et al. ..... 455/266

FOREIGN PATENT DOCUMENTS

WO WO 99/23844 * 5/1999

* cited by examiner

*Primary Examiner* — Tilahun B Gesesse
(74) *Attorney, Agent, or Firm* — Banner & Witcoff, Ltd.

(57) ABSTRACT

Apparatus, and an associated method, for effectuating power control in a radio communication system, such as an IS-95/IS-2000 system which deploys 1×EV-DO technology. At a mobile station, a channel indicia measurer measures channel conditions upon a radio link. Responsive thereto, a data rate selector selects a data rate at which subsequent data is to be communicated to the mobile station. The selection is returned to the network part of the communication system. A selector selects the power level at which to communicate the subsequent data to the mobile station responsive to the requested data rate. The requested data rate is used as a metric by which to select the power level at which to communicate the subsequent data to the mobile station.

38 Claims, 3 Drawing Sheets

APPARATUS, AND ASSOCIATED METHOD, FOR FACILITATING SELECTION OF POWER LEVELS AT WHICH TO COMMUNICATE DATA IN A RADIO COMMUNICATION SYSTEM

Matter enclosed in heavy brackets [ ] appears in the original patent but forms no part of this reissue specification; matter printed in italics indicates the additions made by reissue.

The present invention relates generally to a manner by which to facilitate selection of a power level at which to send data in a radio communication system, such as a cellular communication system constructed pursuant to an IS-95 standard in which 1×EV-DO technology is deployed. More particularly, the present invention relates to apparatus, and an associated method, by which to select the power levels at which to send data upon a data channel, such as MAC data upon an MAC channel, to a mobile, or other communication, station. The mobile station generates a data rate request to request that the data be sent to the mobile station at a requested data rate. The requested data rate is used, in part, to select the power level at which the data is communicated. And, when the channel is used to communicate separate data to a plurality of separate mobile stations, the power levels at which the data is communicated is allocated in manners such that the total power level to communicate all of the separate data to all of the separate mobile stations is within a maximum allowable level. Power control is effectuated while utilizing an existing communication metric of data rate feedback requests.

BACKGROUND OF THE INVENTION

Advancements in communication technologies have permitted the introduction, and popularization of new types of communication systems. In various of such new types of communication systems, the rates of data transmission and the corresponding amount of data permitted to be communicated, has increased relative to existing types of communication systems.

New types of radio communication systems are exemplary of communication systems that have been made possible as a result of advancements in communication technologies. Communication channels of a radio communication system are formed upon radio links, thereby obviating the need for conventional wire line connections between sending and receiving stations operable therein. A radio communication system, therefore, inherently permits increased communication mobility in contrast to conventional wire line systems.

A cellular communication system is exemplary of a radio communication system. Cellular communication systems, constructed according to various communication standards, have been installed throughout significant areas of the world. A mobile station operable in the cellular communication system permits a user to communicate telephonically therethrough when the mobile station is positioned within an area encompassed by the communication system.

The development and implementation of new cellular, as well as other, communication systems capable of communicating packet-formatted data have been made possible as a result of advancements in digital communication techniques. An exemplary cellular communication system which provides for the communication of packet-formatted data is set forth in the IS-95 standard promulgated by the EIA/TIA. Ongoing efforts are made to make improvements to the initial implementation of the standard. The IS-2000 standard, for instance, also sets forth operational parameters for a cellular communication system that is predicated, in part, upon the IS-95 system. Both the IS-95 and IS-2000 communication standards utilize CDMA (Code-Division, Multiple-Access) communication techniques. The standards are sometimes referred to as the IS-95/IS-2000 family of standards.

Deployment of a so-called 1×EV-DO technology together with an IS-95/IS-2000 based communication system has also been proposed. An IS-95 system which deploys 1×EV-DO technology is an evolutionary step from the IS-2000 system and deploys a packet data wireless technology. The 1×EV-DO technology is somewhat disjoined from the IS-95/IS-2000 family of standards in that a system in which the 1×EV-DO technology is deployed is unable to share the same frequencies as the frequencies of existing IS-95 and IS-2000 systems. The 1×EV-DO technology utilizes TDMA (Time-Division, Multiple-Access) schemes instead of the CDMA access scheme utilized in the IS-95/IS-2000 standards.

In a system in which the 1×EV-DO technology is deployed, a channel is defined by a frequency and time slot combination. Pursuant to a communication session, system users are assigned time slots upon which to communication to effectuate the communications pursuant to the communication session. The time slots are sub-divided into three basic payloads. A data payload, an MAC (Medium Access Control) payload, and a pilot payload are all defined. And, the payloads each define a channel, i.e., a data channel, a MAC channel, and a pilot channel.

The MAC channel is utilized by all current users, i.e., mobile stations, at least within a selected area. Different users are assigned different Walsh spreading functions. The MAC channel is thereby a shared channel, and the power levels at which data is communicated upon the MAC channel must be controlled.

As presently promulgated, the IS-95 system which deploys 1×EV-DO technology fails to set forth a power control scheme by which to control the power levels at which data is communicated upon the MAC channel.

A manner by which to control the power levels of data communicated upon a MAC channel would facilitate the communication of the data in a manner to permit its detection at the mobile station to which the data is communicated.

It is in light of this background information related to packet radio communication systems that the significant improvements of the present invention have evolved.

SUMMARY OF THE INVENTION

The present invention, accordingly, advantageously provides apparatus, and an associated method, by which to facilitate selection of a power level at which to send the data in a radio communication system, such as a cellular communication system constructed pursuant to an IS-95/IS-2000 standard in which 1×EV-DO technology is deployed.

Through operation of an embodiment of the present invention, a manner is provided by which to select the power levels at which to send the data upon a data channel, such as MAC (Medium Access Control) data, upon a MAC channel sent upon a forward link to a mobile station.

A mobile station operable to receive the data monitors the received data to determine channel conditions of a radio link upon which the data is communicated. Responsive to measurements made during the monitoring, the mobile station generates a data rate request. The data rate request is a request for the data to be sent thereto at a particular data rate. The requested data rate is used as a metric by which to select the power level at which data is subsequently communicated to the mobile station.

When the channel is used to communicate separate data to a plurality of separate mobile stations, the power levels at which the data is communicated are allocated in manners such that the total power level of all the data communicated upon the data during a selected time interval is within an allowable power level. The total power level is the sum of the power levels of the separate data communicated to the separate mobile stations.

Operation of an embodiment of the present invention thereby advantageously provides a manner by which to effectuate power control over the data transmitted upon the data channel while using a communication metric of data rate feedback.

In one aspect of the present invention, the data channel forms a MAC (Medium Access Control) channel defined in an IS-95/IS-2000 system in which 1×EV-DO technology is deployed. The MAC channel is formed of a time slot defined in a TDM (Time Division Multiplex) access method. All current users in a portion of the communication system utilize the MAC channel. Each of the users, i.e., mobile stations, are allocated a Walsh function. Data to be communicated to separate ones of the mobile stations are encoded by the separate Walsh functions, thereby providing differentiation upon the MAC channel. Effectuation of power control is facilitated thereby to maintain the power levels at which the data communicated upon the MAC channel are collectively maintained within a maximum allowable level.

In another aspect of the present invention, a mobile station performs measurements to determine channel conditions upon a radio link extending thereto and upon which the MAC channel is defined. Responsive to the measurements, the mobile station determines the maximum data rate at which data subsequently to be sent to the mobile station should be communicated. Generally, when channel conditions are good, data is able to be communicated to the mobile station at relatively high data rates. Conversely, when the communication conditions are poor, the data rate at which data can be sent to the mobile station is relatively low. The mobile station generates a DRC (Data Rate Control) command, or other appropriate indications, of a requested data rate at which to communicate subsequent data to the mobile station.

In another aspect of the present invention, the DRC command, or other indication, is communicated to the network of the IS-95/IS-2000 system in which the 1×EV-DO technology is deployed. The network detects the DRC command, or other indication, and utilizes the value of the command or indication as a metric by which to select the power levels at which to send subsequent data to the mobile station.

The total amount of power available to communicate separate data to separate mobile stations upon the MAC channel is defined. The total power level is, for instance, a system-defined parameter or, alternately, an operationally-selected parameter value. An average power level available by which to communicate data to N current users, i.e., mobile stations, is determined by dividing the total power level available by the number N of current users. And, the average power allocated to each data communication is further differentiated depending upon the value of the DRC command received at the network. The DRC command is of one of a finite set of values. The value of the DRC command is multiplied together with the average power available to each current user, and the product is multiplied by a gain factor. The gain factor is selected such that the summation of all the power levels at which the separate data are sent to the separate mobile stations upon the MAC channel are within a maximum allowable total power level.

In these and other aspects, therefore, apparatus, and an associated method, is provided for a two-way radio communication system. At least first selected forward-link data is communicated by a network station upon a forward link channel to at least a first selected mobile station. Selection of a power level at which the first selected forward-link data is communicated is facilitated. A first channel quality indicia measurer is positioned at the first selected mobile station. The first channel quality indicia measurer measures an indicia of communication quality levels upon the forward link channel and forms a first channel-quality indicia value responsive thereto. A first data rate selector is coupled to a first channel quality indicia measurer to receive the first channel-quality indicia value. The first data rate selector selects a first data rate at which to communicate subsequent first selected forward-link data upon the forward link and forms a first data rate selection value responsive to selection made thereat. An indication of the first data rate selection value, when returned to the network station, is used to select the power level at which to communicate the subsequent first selected forward-link data to the first selected mobile station.

A more complete appreciation of the present invention and the scope thereof can be obtained from the accompanying drawings which are briefly summarized below, the detailed description of the presently preferred embodiments of the invention, and the appended claims.

DETAILED DESCRIPTION

Figure 1:
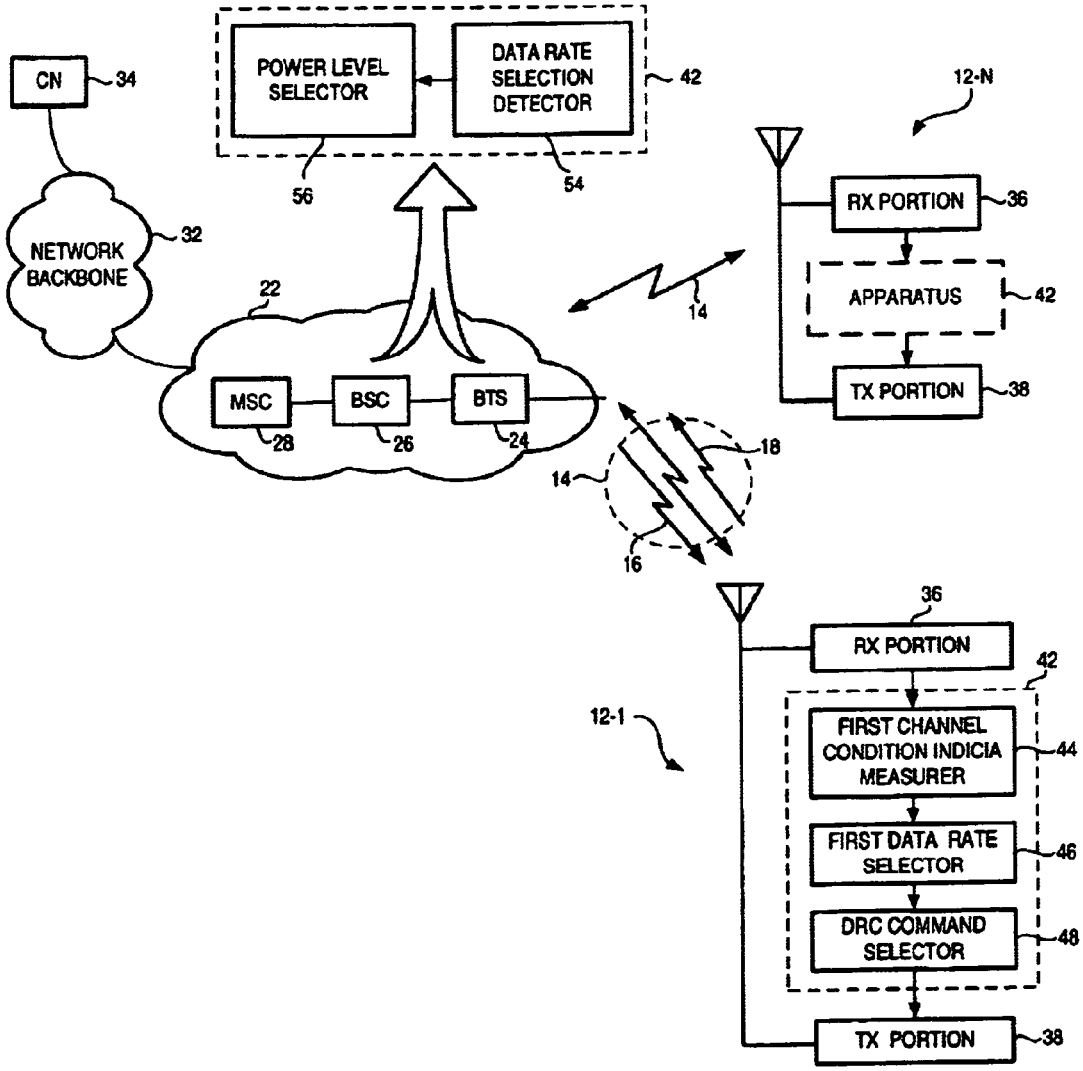
FIG. 1 illustrates a functional block diagram of a packet radio communication system in which an embodiment of the present invention is operable.

Referring first to FIG. 1, a functional representation of a communication system, shown generally at 10, operates to communicate data by way of radio channels defined upon radio links formed between mobile stations and the network part of the communication system. Here, two mobile stations 12 are shown—the mobile station 12-1 and the mobile station 12-N.

In the exemplary implementation, the communication system forms an IS-95/IS-2000 cellular radio communication system in which 1×EV-DO technology is deployed. The following description of exemplary operation of the communication system, and of operation of an embodiment of the present invention employed therein, shall be described with respect to the exemplary implementation. The teachings of the present invention are, of course, also implementable in other types of communication systems by which to facilitate effectuation of control over the power levels of signals communicated therein.

The communication system provides for two-way communication between the network part of the communication system and mobile stations operable therein. Radio links formed between the mobile stations and the network portion define, thereby, both forward link portions and reverse link portions. A radio link 14 extending between the mobile station 12-1 and the network portion of the communication system is here, therefore, shown to include a forward link portion 16 and a reverse link portion 18. An analogous radio link, including corresponding forward and reverse link portions can also be presented.

Data communicated to the mobile station is communicated upon the forward link portion 16, and data communicated by the mobile station to the network portion is communicated upon the reverse link 18. Data communicated by the mobile station to the network portion includes feedback information used pursuant to operation of an embodiment of the present invention by which to effectuate power control of data communicated upon the forward link portion 16 to the mobile station.

The network portion of the communication system includes a radio access network (RAN) 22. The radio access network forms the radio part of the network portion of the communication system. Here, the radio access network is shown to include a base transceiver station (BTS) 24. The base transceiver station is operable, amongst other things, to transceive data communicated upon the radio link 14. The base transceiver station is coupled to a base station controller (BSC) 26 that also forms a portion of the radio access network. The base station controller is operable, amongst other things, to control operation of the base transceiver station. And, the base station controller is coupled to a mobile switching center (MSC) 28.

The network portion of the communication system here further includes a network backbone, such as a PSTN (public-switched, telephonic network) or a PDN (packet data network), such as the internet. Circuit-switched data or packet-switched data, as appropriate, is routed through the network backbone pursuant to a communication session to effectuate communication of data between, a correspondent node (CN) 34 and a mobile station. The correspondent node is representative of any communication device from which data is originated or to which data is terminated. The mobile station 12-1 includes a receive portion 36 and a transmit portion 38. Data communicated to the mobile station upon the forward link portion 16 of the radio link is detected, and operated upon, by the receive portion 36. And, data originated at the mobile station for communication upon the reverse link portion 18 of the radio link is operated upon the transmit portion 38. The mobile station 12-N, as well as other mobile stations, includes corresponding structure. And, the corresponding structure of the mobile station 12-N is commonly-referenced.

The mobile station 12-1 further includes apparatus 42 of an embodiment of the present invention. The mobile station 12-N includes corresponding, commonly-referenced apparatus. The apparatus includes elements which are functionally represented in the figure. While in the exemplary implementation, the elements forming the apparatus 42 are implemented as algorithms executable by processing circuitry, the functionality of the elements of the apparatus are implementable in any desired manner.

Here, the apparatus 42 shown to include a first channel condition indicia measurer 44 and a first data rate selector 46. The measurer 44 is coupled to the receive portion 36 of the mobile station. Data communicated to the mobile station upon the forward link portion of the radio link is detected, and operated upon, by the receive portion 36. The measurer 44 monitors communication conditions upon the forward link portion of the radio link. Here, more particularly, in the exemplary implementation, communication conditions on a MAC (Medium Access Control) channel defined in the IS-95/IS-2000 system in which 1×EV-DO technology is deployed are monitored. By monitoring the data communicated to the mobile station upon the MAC channel, the measurer measures, or otherwise determines, the channel conditions, here, e.g., referenced in terms of a channel quality indicia, of the MAC channel.

A value representative of the measured indicia is provided to the first data rate selector. Selection is made at the data rate selector of the data rate at which subsequent data shall be requested to be communicated to the mobile station. When communication conditions upon the MAC channel are good, indicated by the channel condition indicia measured by the measurer, the selector selects a relatively high data rate at which to send subsequent data to the mobile station. If, conversely, measurements made by the measurer indicate the channel conditions to be relatively poor, the selector selects a relatively low data rate at which to communicate subsequent data to the mobile station.

Here, the apparatus 42 further includes a DRC (data rate control) command generator 48 coupled to the selector 46 to receive an indication of selection made by the selector. The command generator generates a DRC command of a value responsive to the value of the selection made by the selector. The values permitted of the DRC command generator are selected from an allowable set of values. The allowable set is defined, for instance, in the IS-95/IS-2000 operational specification that pertains to 1×EV-DO technology.

The DRC command generator is coupled to the transmit portion 38, and the transmit portion operates to send the DRC command upon the reverse link portion 18 of the radio link back to the network part of the communication system.

The radio access network includes further apparatus 42 of an embodiment of the present invention. Again, the apparatus is functionally represented and includes functional elements that are implemented in any desired manner at a selected device, or combination of devices of the radio access network. Again, in the exemplary implementation, the functions performed by the apparatus 42 are implemented, at least in part, by algorithms executable by processing circuitry. In the figure, the further apparatus positioned at the radio access network is represented to be embodied at the base station controller and base transceiver station, together forming a base station system (BSS) of the network. The further apparatus, in other implementations, is implemented at other structure of the radio access network, or elsewhere in the communication system.

The further apparatus 42 includes a data rate selection value detector 54 and a power level selector 56 coupled thereto.

The data rate selection value detector 54 is coupled to receive an indication of the data rate selection made by the mobile station 12. Analogously, data rate selection is made by other mobile stations, such as the mobile station 12-N, and returned upon reverse link portions of radio links formed with the radio access network are also detected by the detector 54. In the exemplary implementation in which the mobile stations include DRC generators for generating DRC commands, the detector is operable to detect values of the DRC commands.

Detections made by the detector are provided to the power level selector 56. The power level selector selects the power level at which subsequent data communicated upon the MAC channel is communicated to the mobile station 12 responsive to the detection of the requested data rates detected by the detector 54. A metric associates power levels with data rates. In general, when a higher data rate is requested, a lower power level is required to communicate the subsequent data as the higher data rate is associated, generally, with measurements of good channel conditions. Conversely, requests for lower data rates are generally associated with higher required power levels as a request for a low data rate is generally associated with measurement of poor channel conditions.

Figure 2:
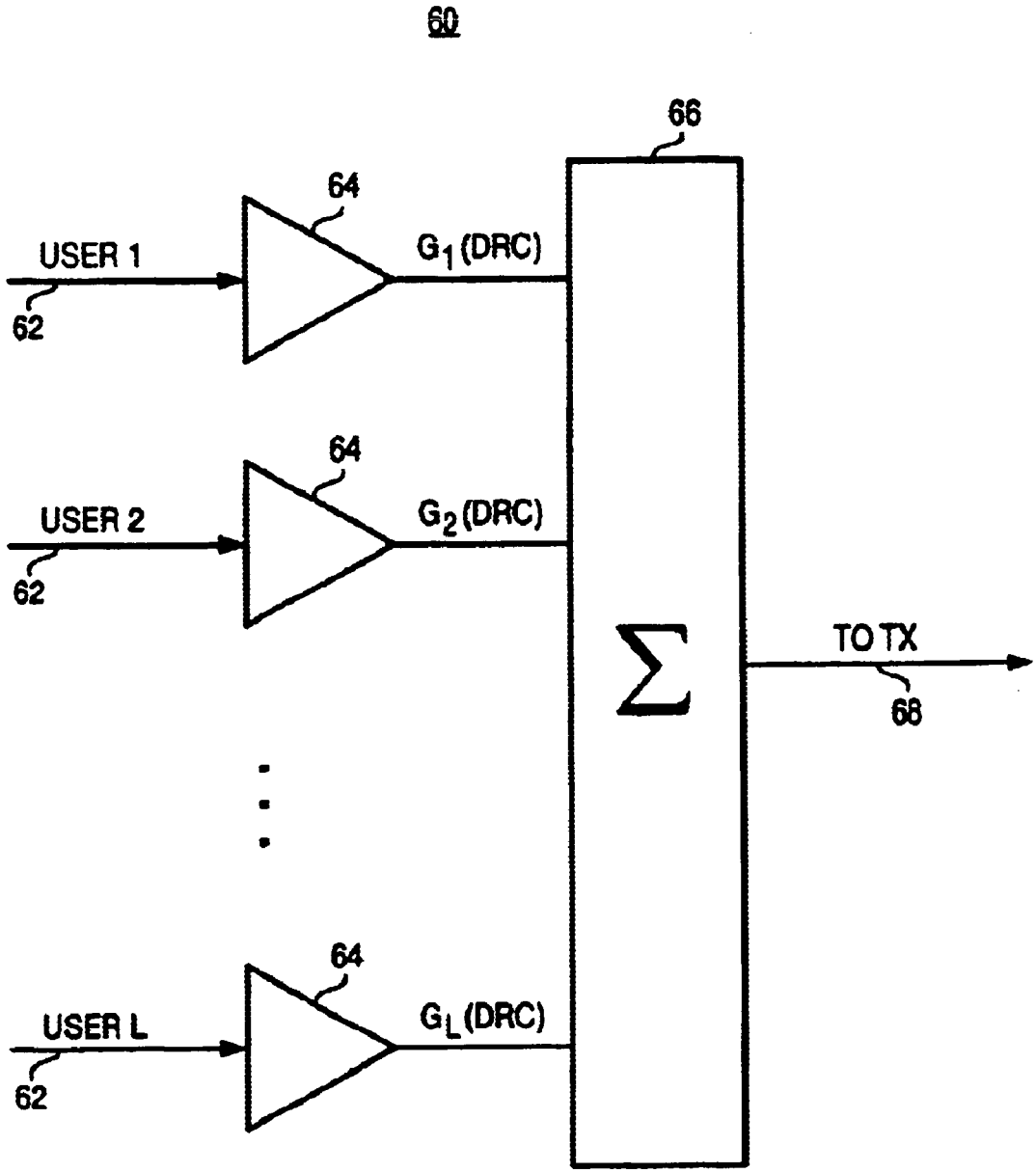
FIG. 2 illustrates a functional representation of operation of an embodiment of the present invention by which power levels are allocated for separate communications upon the shared MAC channel.

Additionally, the power level selections made by the power level selector are also made such that the total power levels of all of the data communicated upon the MAC channel to separate ones of the mobile stations are within an allowable maximum value. Thereby, the power level allocations made by the power level selector are further responsive to the maximum allowable power level of all communications permitted on the MAC channel. FIG. 2 illustrates a functional representation, shown at 60, of the manner by which scaling of power levels allocated by the power level selector 56 (shown in FIG. 1) is performed to maintain the maximum power levels of all of the data communicated upon the MAC channel within a maximum total power level.

The lines 62 are representative of lines upon which MAC data to be communicated to active mobile stations are generated, such as in the transmit portion of the base transceiver station 24 (shown in FIG. 1) of the radio access network. L separate lines are representative of data sent to L separate mobile stations. Each of the lines 62 is coupled to a variable gain element 64. The variable gain element amplifies the data provided thereto upon the respective ones of the lines 62 according to a selected gain.

Here, the gain is indicated by G (DRC). Separate gains levels G are associated with the different lines 62. The power levels are summed together by a summer 66 and the total output power levels are represented on the line 68. Appropriate selection of the separate gains G of the separate gain elements 64 are made such that the total power levels of the line 68 are within a selected maximum power level. As the gain associated with each of the gain elements 64 is related to a gain value, G, and a value of a DRC (Data Rate Command) the gain by which the data generated on the separate line 62 is dependent both upon the data rate requested by an associated mobile station and also the gain G selected by which to amplify the data.

That is to say, the total power, P, is subdivided amongst all N current users, i.e., mobile stations, that are assigned a Walsh code for communication of data upon the MAC channel. The average power allocated to each user is, therefore, $P_t/N$. To allocate power levels at which to communicate the separate data to the separate users, B classes of gain are defined. The classes of gain correspond to B levels of DRC available in the communication system. The individual users are allocated power according to:

$$\frac{P_t}{N} G_I(\mathrm{DRC})$$

Wherein:

$G_I$ is the gain related to the Bth set for the Ith user;

N is the number of users which are assigned a Walsh code; and DRC is the value of the data rate command.

The gains are allocated on a per-user basis for all users where the gain function G is solved under the total power constraint of:

$$P_t = \sum_{t=1}^{L} \frac{P_t}{N} G_I(\mathrm{DRC})$$

wherein L is the total number of MAC users.

Figure 3:
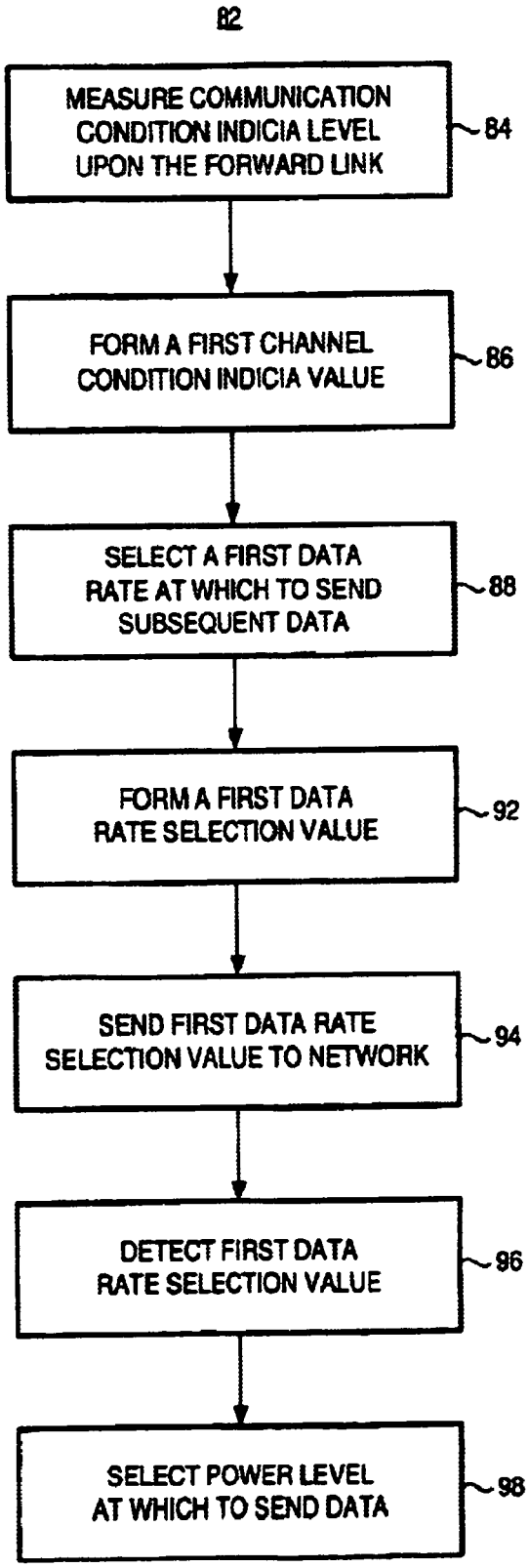
FIG. 3 illustrates a method flow diagram listing the method of operation of an embodiment of the present invention.

FIG. 3 illustrates a method flow diagram, shown generally at 82, of an embodiment of the present invention. The method facilitates selection of a power level at which first-selected forward link data is communicated in a two-way radio communication system.

First, and as indicated by the block 84, measurement is made at the first selected mobile station, of an indicia of communication condition levels upon the forward link channel. Then, and as indicated by the block 86, a first channel condition indicia value is formed. The first channel quality indicia value is of a value responsive to the measurements made during the operation of measuring.

Then, and as indicated by the block 88, a first data rate at which to communicate subsequent first-selected, forward-link data upon the forward link is selected. And, as indicated by the block 92, a first data rate selection value is formed.

Then, and as indicated by the block 94, the first data rate selection value is sent to the network station. And, as indicated by the block 96, the first data rate selection value is detected, upon reception at the network station. And, as indicated by the block 98, the power level at which to communicate the first-selected, forward-link data is selected.

Through operation of an embodiment of the present invention, thereby, the power level at which data is communicated upon a shared channel, such as a MAC channel, is selected. Power control of communication of data upon the channel is controlled thereby. The effectuation of the power control is made while utilizing an existing communication metric of data rate feedback requests.

The preferred descriptions are of preferred examples for implementing the invention, and the scope of the invention should not necessarily be limited by this description. The scope of the present invention is defined by the following claims.

In the claims:

1. Apparatus for a two-way radio communication system in which at least a first selected forward-link data is communicated by a network station upon a forward link channel to at least a first selected mobile station, said apparatus for the first selected mobile station for facilitating selection of a power level at which the first selected forward-link data is communicated, said apparatus comprising:

a first channel condition indicia measurer positioned at the first selected mobile station, said first channel condition indicia measurer for measuring an indicia of communication quality levels upon the forward link channel and for forming a first channel-condition indicia value responsive thereto;

a first data rate selector coupled to said first channel condition indicia measurer to receive the first channel-condition indicia value, said first data rate selector for selecting a first data rate at which to communicate subsequent first selected forward-link data upon the forward link and for forming a first data rate selection value responsive to selection made thereat, an indication of the first data rate selection value, when returned to the network station, used to select the power level at which to communicate the subsequent first selected forward-link data to the first selected mobile station;

wherein the radio communication system defines a MAC (Medium Access Control) channel and wherein the indication of the data rate selection value, when returned to the network station, is used to select the [vower] *power* level at which to communicate subsequent first selected MAC-channel data to the first selected mobile station;

wherein the radio communication system comprises a 1×EV-DO packet radio communication system, wherein the MAC channel comprises a TDM (Time Division Multiplexed) channel upon which the first selected MAC-channel data is communicated, and wherein said channel condition indicia measurer measures the indicia of the communication condition levels at least within the TDM channel of which the MAC channel is comprised;

wherein the at least the first selected mobile station comprises the first selected mobile station and at least a second selected mobile station, wherein second selected MAC-channel data is also communicated upon the MAC channel by the network station to the second mobile station;

at least a second channel condition indicia measurer positioned at the at least the second selected mobile station, said second channel condition indicia measurer for measuring an indicia of communication condition levels upon the MAC channel and for forming a second channel condition indicia value responsive thereto; and at least a second data rate selector coupled to said second channel condition indicia measurer to receive the second channel-condition indicia value, said second data rate selector for selecting a second data rate at which to communicate subsequent second selected MAC-channel data upon the MAC channel and for forming a second data rate selection value responsive to selection made thereat, an indication of the second data rate selection value, when returned to the network station, used to select the power level at which to communicate the subsequent second selected MAC-channel data to the second selected mobile station.

2. In a two-way radio communication system in which at least a first selected forward-link data is communicated by a network station upon a forward link channel to at least a first selected mobile station, an improvement of apparatus for the first selected mobile station for facilitating selection of a power level at which the first selected forward-link data is communicated, said apparatus comprising:

a first channel condition indicia measurer positioned at the first selected mobile station, said first channel condition indicia measurer for measuring an indicia of communication quality levels upon the forward link channel and for forming a first channel-condition indicia value responsive thereto;

a first data rate selector coupled to said first channel condition indicia measurer to receive the first channel-condition indicia value, said first data rate selector for selecting a first data rate at which to communicate subsequent first selected forward-link data upon the forward link and for forming a first data rate selection value responsive to selection made thereat, an indication of the first data rate selection value, when returned to the network station, used to select the power level at which to communicate the subsequent first selected forward-link data to the first selected mobile station;

a data rate selection value detector coupled to receive an indication of the first data rate selection value formed by said first data rate selector once returned to the network station, said data rate selection value detector for detecting the first data rate selection value;

a power level selector coupled to said data rate selection value detector, said power level selector for selecting the power level at which to communicate the first selected forward-link data to the first selected mobile station responsive to the first data rate selection value detected by said data rate selection value detector;

wherein the radio communication system comprises a 1×EV-DO packet radio communication system which defines a MAC (Medium Access Control) channel, wherein the first selected forward-link data comprises first selected MAC channel data, and wherein the indication of the data rate selection value to which said data rate selection value selector is coupled to receive is representative of the first data rate selected by said first data rate selector at which to communicate subsequent first selected MAC channel data to the first mobile station;

wherein the 1×EV-DO packet radio communication system forms a multi-user system, wherein the at least the first selected mobile communication station comprises the first selected mobile station and at least a second selected mobile station, wherein second selected MAC-channel data is also communicated upon the MAC channel by the network station to the second mobile station;

at least a second channel condition indicia measurer positioned at the at least the second selected mobile station, said second channel condition indicia measurer for measuring an indicia of communication condition levels upon the MAC channel and for forming a second channel condition indicia value responsive thereto; and at least a second data rate selector coupled to said second channel condition indicia measurer to receive the second channel-condition indicia value, said second data rate selector for selecting a second data rate at which to communicate subsequent second selected MAC-channel data upon the MAC channel and for forming a second data rate selection value responsive to selection made thereat, an indication of the second data rate selection value, when returned to the network station, used to select the power level at which to communicate the subsequent second selected MAC-channel data to the second selected mobile station.

3. The apparatus of claim 2 wherein said data rate selection value detector is further coupled to receive an indication of the second data rate selection value formed by said second data rate selector, said data rate selection value detector further for detecting the second data rate selection value.

4. The apparatus of claim 3 wherein said power level selector further selects the power level at which to communicate second selected MAC-channel data to the second selected mobile station.

5. The apparatus of claim 4 wherein said power level selector selects the power levels at which subsequently to communicate the first selected MAC-channel data and the second selected MAC-channel data, respectively, upon the MAC-channel, the power levels, when summed together, are within an allowable maximum power level.

6. The apparatus of claim 5 wherein the first and at least second data rate selection values, formed by said first data rate selector and said second data rate selector, respectively, are selected from a set of allowable data rate selection values.

7. The apparatus of claim 6 wherein the power levels selected by said power level selector are selected responsive at least to the maximum allowable power level, and to the first and at least the second data rate selection values.

8. The apparatus of claim 7 wherein the 1×EV-DO packet radio communication system defines a current-usage set of mobile stations, the current-usage set of mobile stations including the first and at least second mobile stations, wherein each mobile station of the current-usage set is allocated a unique communication code and wherein the power levels selected by said power level selector are selected further responsive to a number of mobile stations contained in the current-usage set.

9. In a method for communicating in a two-way radio communication system in which at least first selected forward-link data is communicated by a network station upon a forward link channel to at least a first selected mobile station, an improvement of a method for facilitating selection of a power level at which the first-selected forward link data is communicated, said method comprising:

measuring, at the first selected mobile station, an indicia of communication condition levels upon the forward link channel;

forming a first channel-condition indicia value responsive to measurements made during said operation of measuring;

selecting a first data rate at which to communicate subsequent first-selected forward-link data upon the forward link;

forming a first data rate selection value responsive to selection made during said operation of selecting, an indication of the first data rate selection value, when returned to the network station, used to select the power level at which to communicate the subsequent first-selected forward link data;

sending the first data rate selection value formed during said operation of forming the first data rate selection value to the network station;

detecting the first data rate selection value once received at the network station;

selecting the power level at which to communicate the first-selected forward-link data to the first selected mobile station responsive to the first data rate selection value detected during said operation of detecting;

wherein the radio communication system comprises a multi-user communication system, wherein the at least the first selected mobile station comprises the first selected mobile station and at least a second selected mobile station;

measuring, at the second selected mobile station, an indicia of communication condition levels upon the forward link channel;

forming a second channel-quality indicia value responsive to measurements made during said operation of measuring at the second selected mobile station;

selecting a second data rate at which to communicate subsequent second-selected forward-link data upon the forward link;

forming a second data rate selection value responsive to selection made during said operation of selecting the second data rate; and sending the second data rate selection value to the network station.

10. The method of claim 9 wherein said operation of selecting the power level comprises both selecting the power level at which to communicate the first-selected forward-link data and also the power level at which to communicate the second-selected forward-link data.

*11. A system, comprising:*

*a first measurer positioned at a first mobile station, the first measurer configured to measure a communication quality condition of a forward link channel over which forward-link data is communicated by a network station, the first measurer further configured to form a first channel-condition signal based on the measured communication condition;*

*a first data rate selector coupled to the first measurer and configured to receive the first channel-condition signal, the first data rate selector for selecting a first data rate at which to communicate subsequent forward-link data and for determining an indication of the selected first data rate, said selecting at least partially based on the first channel-condition signal;*

*a second measurer positioned at a second mobile station, the second measurer configured to measure a communication condition of the forward link channel and to form a second channel-condition signal based on the measured communication condition of the forward link channel;*

*a second data rate selector coupled to the second measurer and configured to receive the second channel-condition signal, the second data rate selector further configured to select a second data rate at which to communicate subsequent MAC-channel data at least partially based on the second channel-condition signal, and for determining an indication of the selected second data rate;*

*a receiver positioned at the network station and configured to receive the indications of the first and second data rates; and*

*a selector coupled to the receiver and configured to select, based on the received indication of the first data rate, a first power level at which to send first MAC (Medium Access Control) data to the first mobile station, and further configured to select, based on the received indication of the second data rate, a second power level at which to send second MAC data to the second mobile station.*

*12. The system of claim 11, wherein the first data rate selector is further configured to form an indication of the first data rate, wherein the second data rate selector is further configured to form an indication of the second data rate and wherein the apparatus further includes:*

*a first transmitter positioned at the first mobile station and configured to transmit the indication of the first data rate to the network station; and*

*a second transmitter positioned at the second mobile station and configured to transmit the indication of the second data rate to the network station.*

*13. The system of claim 11, wherein the system provides for a 1×EV-DO packet radio communication system.*

*14. The system of claim 11, further including a transmitter coupled to the selector, wherein the transmitter is configured to transmit on a MAC channel the first MAC data at the first power level and the second MAC data at the second power level, wherein the MAC channel is formed of a time slot defined in a TDM (time division multiplex) access method, and wherein the first and second mobile stations are each allocated a separate Walsh function on the MAC channel.*

*15. A method, comprising:*

*monitoring, at an apparatus, a first communication condition of a first radio channel having data transmitted at a first power level;*

*determining a first data rate based on the first communication condition, the determined first data rate identifying a rate of data transmission;*

*transmitting an indication of the determined first data rate as first data over a second radio channel;*

*determining a second power level based on the indication of the determined first data rate, wherein the second power level identifies a power level at which subsequent data is transmitted; and*

*transmitting second data over a third radio channel at the second power level.*

*16. The method of claim 15, further including:*

*monitoring a second communication condition of the first radio channel;*

*determining a second data rate based on the second communication condition;*

*wirelessly transmitting third data, wherein the third data indicates the determined second data rate;*

*determining a third power level based on the third data; and*

*transmitting fourth data over the third radio channel at the second power level.*

*17. The method of claim 16, further including:*

*encoding the second data using a first encoding function; and*

*encoding the fourth data using a different second encoding function.*

*18. The method of claim 16, wherein determining the third power level includes determining the third power level based on the second power level.*

*19. The method of claim 16, wherein determining the third power level includes determining the third power level such that a total amount of power transmitted over the third radio channel is within a predetermined maximum power level.*

*20. The method of claim 15, wherein the third radio channel corresponds to a single time slot in a TDMA (time-division, multiple-access) channel.*

*21. The method of claim 20, further including:*

*encoding the second data by a first Walsh function; and*

*encoding the fourth data by a different second Walsh function.*

*22. A system, comprising:*

*first circuitry positioned at a first mobile station and configured to monitor a first communication condition of a first radio channel having data transmitted at a first power level, the first circuitry further configured to determine a first data rate based on the first communication condition, the determined first data rate identifying a rate of data transmission;*

*a first transmitter coupled to the first circuitry and configured to transmit an indication of the determined first data rate as first data over a second radio channel;*

*a receiver positioned at a network station and configured to receive the indication of the determined first data rate over the second radio channel;*

*a selector coupled to the receiver and configured to determine a second power level based on the indication of the determined first data rate, wherein the second power level identifies a power level at which subsequent data is transmitted; and*

*a second transmitter coupled to the selector and configured to transmit second data over a third radio channel at the second power level.*

*23. The system of claim 22, further including:*

*second circuitry positioned at a second mobile station and configured to monitor a second communication condition of the first radio channel, the second circuitry further configured to determine a second data rate based on the second communication condition; and*

*a third transmitter coupled to the second circuitry and configured to wirelessly transmit third data, wherein the third data indicates the determined second data rate,*

*wherein the receiver is further configured to receive the third data, and*

*wherein the selector is further configured to determine a third power level based on the third data, and the second transmitter is further configured to transmit fourth data over the third radio channel at the third power level.*

*24. The system of claim 23, wherein the second data is encoded with a first encoding function and the fourth data is encoded with a different second encoding function.*

*25. The system of claim 23, wherein the selector is further configured to determine the third power level based on the second power level.*

*26. The system of claim 23, wherein the selector is further configured to determine the third power level such that a total amount of power transmitted over the third radio channel is within a predetermined maximum power level.*

*27. The system of claim 22, wherein the third radio channel corresponds to a single time slot in a TDMA (time-division, multiple-access) channel.*

*28. The system of claim 27, wherein the second data is encoded by a first Walsh function and the fourth data is encoded by a different second Walsh function.*

*29. An apparatus, comprising:*

*first circuitry configured to receive first data from each of a plurality of mobile stations, the first data from each of the mobile stations indicating a data rate of data transmitted at a respective power level, the indicated data rate identifying a rate of data transmission;*

*second circuitry coupled to the first circuitry and configured to determine a plurality of power levels, wherein*

*the plurality of power levels includes, for each mobile station of the plurality of mobile stations, a first data power level based on the indicated data rate of the first data received from the mobile station, and*

*each first data power level identifies a power level at which subsequent data is transmitted; and*

*a transmitter coupled to the second circuitry and configured to, for each mobile station of the plurality of mobile stations, transmit second data at the first data power level of the mobile station.*

*30. An apparatus, comprising:*

*first circuitry configured to receive first data from each of a plurality of mobile stations, the first data from each of the mobile stations indicating a data rate of data transmitted at a respective power level;*

*second circuitry coupled to the first circuitry and configured to, for each respective one of the mobile stations, determine a power level based on the first data, including the indicated data rate; and*

*a transmitter coupled to the second circuitry and configured to, for each of the mobile stations, transmit second data at the respective determined power level,*

*wherein the second circuitry is further configured to maintain all transmitted second data within a maximum power level, the maintaining including calculating a sum of all the determined power levels, wherein the sum is within the maximum power level.*

*31. The apparatus of claim 29, wherein the transmitter is configured such that the second data is transmitted to all of the mobile stations on a same shared channel.*

*32. The apparatus of claim 31, wherein the channel corresponds to a single time slot in a TDMA (time-division, multiple-access) channel.*

*33. The system of claim 32, wherein the second data transmitted to all of the mobile stations is each encoded by a different Walsh function.*

*34. A method, comprising:*

*receiving first data from each of a plurality of mobile stations, the first data from each of the mobile stations indicating a data rate of data transmitted at a respective power level, the indicated data rate identifying a rate of data transmission;*

*determining determine a plurality of power levels, wherein the plurality of power levels includes, for each mobile station of the plurality of mobile stations, a first data*

*power level based on the indicated data rate of the first data received from the mobile station, and*

*each first data power level identifies a power level at which subsequent data is transmitted; and*

*transmitting, for each mobile station of the plurality of mobile stations, second data at the first data power level of the mobile station.*

*35. The method of claim 34, wherein determining includes maintaining all transmitted second data within a maximum power level, the maintaining including calculating a sum of all the determined power levels, wherein the sum is within the maximum power level.*

*36. The method of claim 34, wherein transmitting includes transmitting the second data for all of the mobile stations on a same shared channel.*

*37. The apparatus of claim 36, wherein the channel corresponds to a single time slot in a TDMA (time-division, multiple-access) channel.*

*38. The system of claim 37, wherein the second data transmitted to all of the mobile stations is each encoded by a different Walsh function.*

* * * * *